INVENTOR
D.B. PERRY
BY [signature]
ATTORNEY

Feb. 5, 1952 D. B. PERRY 2,584,736

TELEGRAPH SWITCHING SYSTEM

Filed May 2, 1950 4 Sheets-Sheet 2

INVENTOR
D. B. PERRY

BY

ATTORNEY

Feb. 5, 1952 D. B. PERRY 2,584,736

TELEGRAPH SWITCHING SYSTEM

Filed May 2, 1950 4 Sheets-Sheet 3

INVENTOR
D.B. PERRY
BY H.A. Patterson
ATTORNEY

INVENTOR
D. B. PERRY
BY
ATTORNEY

Patented Feb. 5, 1952

2,584,736

UNITED STATES PATENT OFFICE 2,584,736

TELEGRAPH SWITCHING SYSTEM

Donald B. Perry, Maplewood, N. J., assignor to American Telephone and Telegraph Company, a corporation of New York Application May 2, 1950, Serial No. 159,573

7 Claims. (Cl. 178—2)

This invention relates to permutation code, start-stop telegraph intercommunication systems of the type arranged for half-duplex operation in which transmission may be accomplished in one or the other direction at a time over a subscriber loop circuit but not in both directions simultaneously.

More particularly the invention relates to such systems in which automatic transmitters, for example, tape controlled transmitter-distributor sets, are utilized for transmission and supplied with message material from time to time by means of a reperforator controlled by another incoming telegraph line or loop circuit.

In an exemplary embodiment there are assumed to be a plurality of outlying subscriber stations each with its own loop circuit terminating at a common switching center, each loop circuit having a termination for messages incoming at an operating or switching position in the switching center. Four subscriber loop circuits are shown and described herein as respectively terminating at four operating positions. Each operating position comprises manually operated means for connecting itself with one or more of the loop circuits other than the one which terminates thereat, for retransmitting the messages incoming over the loop circuit terminating thereat, to one or more of the other loop circuits, as desired.

An object of the invention is to automatically indicate at any one of the operating positions at which an incoming message is received over a loop circuit, one or more of the other loop circuits to which the incoming message is to be retransmitted.

Heretofore a unitary machine known as the typing reporforator - transmitter - distributor set which includes a typing reperforator, a tape transmitter, switching mechanism and a simplified mechanical interconnection between the tape transmitter and the switching mechanism, was employed in communication systems for automatically directing and transmitting messages from a station of origin to a station of destination through a switching center in accordance with and under the control of a directing, or address, character signal preceding the message and "end-of-message" character signals following each message.

In accordance with the present invention a plurality of operating positions at a switching center are respectively arranged to receive from a plurality of subscriber loop circuits message signals, and a typing reperforator-transmitter-distributor set at each operating position is adapted to reperforate, type, store and retransmit the message signals incoming over its respectively associated subscriber loop circuit to any one or more of the other loop circuits when such other loop circuits become available for use. The message signals incoming over any one of the subscriber loop circuits are perforated in the tape for retransmission through the switching mechanism and the distributor, in turn, to the repeater relays of the other subscriber loop circuits. When one only of the other loop circuits is selected the repeater relay of such other loop circuit only effectively repeats the message signals, but when two or more of the other loop circuits are selected the repeater relays of only the selected loop circuits effectively repeat the message, the repeatered message being transmitted over the selected loop circuits simultaneously. The directing or address signal or signals corresponding to certain letter characters which precede the message, however, are perforated in the tape for transmission through the switching mechanism but not through the distributor, to cause to light at a location corresponding to the operating position whereat the signal is received, a directing lamp or lamps respectively indicating the loop circuit or circuits over which the message signals are to be repeated. An attendant at the switching center, upon observing the lighted lamp or lamps, momentarily closes a selecting key for each of the loop circuits, so indicated, to condition them, and then momentarily closes a start key individual to the operating position at which the message signals are received, to cause the transmitter-distributor thereat to respond to the perforated signals in the tape whereby the message signals are transmitted to the repeater relays of the desired loop circuits. At the completion of the transmission of the message the incoming "end-of-message" signals, that is, "figures H," are perforated in the tape, and like the directing signal, are transmitted through the switching mechanism only, whereby the tape transmitter and distributor are automatically stopped.

A feature of the invention is the provision of operable means at an operating position in a switching center for causing to be indicated in response to one or more directing code signal combinations incoming over the loop circuit terminating at the operating position, the one or more of the other lop circuits over which the incoming message is to be repeated.

Another feature is the provision of means in the switching mechanism of the typing reperforator-transmitter-distributor set for controlling in response to coded signal combinations incoming over any one of the loop circuits the selections of the signal lamps which indicate one or more of the other loop circuits over which an incoming message is to be repeated.

Another feature is the provision of means for making busy one or more of a plurality of loop circuits in response to code signal combinations received from another of the plurality of loop circuits.

Another feature is the provision of manually operable means for conditioning one or more loop circuits to receive the message incoming over another of the subscriber loop circuits in accordance with the signaling lamps lighted in response to one or more directing code signal combinations incoming over the other one of the loop circuits.

Another feature is the provision of manually operable means for each of a plurality of loop circuits for conditioning, when operated in accordance with one or more signaling lamps lighted in response to one or more directing code signal combinations, respectively, incoming over another of the loop circuits, the one or more of the plurality of loop circuits to receive a message incoming over the other one of the loop circuits.

Another feature is the provision of manually operable means at each of the operating positions for simultaneously completing the connections of one or more loop circuits conditioned to repeat a message incoming over another of the loop circuits, through the operating position whereby the message incoming over the other one of the loop circuits may be repeated to the first-mentioned one or more loop circuits.

Another feature is the provision of means for sending a warning signal over a selectively seized one or more loop circuits of a plurality of loop circuits desired in a connection whenever the seizure of one or more others of the loop circuits of such plurality must be delayed because they are busy in one or more other connections, the warning signal being repeated continuously over the seized loop circuits until the busy loop circuits are free and available for the desired connection, thus precluding the use of the seized loop circuit by its respective outlying station.

Another feature is the provision of lock-out means at each of the operating positions for preventing at the operating position the reception of message signals in the loop circuit terminating at such position, that is, primarily connected thereto, when the signals are being transmitted to such loop circuit from another of the operating positions.

Another feature is the provision of other locking-out means at each of the operating positions for preventing at the position the transmission of message signals over the loop circuit terminating at such position, that is, primarily connected thereto, at a time when message signals are being transmitted over such loop circuit from another operating position.

Another feature is the provision of an arrangement in an intercommunicating telegraph system for permitting the simultaneous routing of two or more messages, each to one or more subscriber loop circuits at a switching center, such message routings being independent of each other in that none of the loop circuits is connected to receive more than one of the messages so routed.

The above and other objects and features of this invention are set forth in the following description and appended claims and may be more readily understood if considered in conjunction with the accompanying drawings, in which are shown four of a plurality of subscriber loop circuits arranged for interconnection through a switching center, with only such apparatus as is necessary for a clear understanding of the invention.

The accompanying drawing shows the equipment at the switching center, of which:

Figs. 1 and 3 show operating positions L, S, Y and T arranged to receive messages incoming over subscriber loop circuits L, S, Y and T, respectively; and Figs. 2 and 4 show the terminations of subscriber loop circuits L, S, Y and T with means for effectively associating any one of the subscriber loop circuits to one or more of the other loop circuits so that signals incoming over any one of the loop circuits may be repeated to one or more of the other loop circuits, as desired.

GENERAL DESCRIPTION

The arrangement contained in Figs. 1 to 4 shows a plurality of subscriber loop circuits respectively arranged to terminate incoming calls at a corresponding number of operating positions at a switching center, each loop circuit being arranged for a secondary connection to one or more of the other of the loop circuits by manually operated switches at the operating position of the loop circuit over which the call is received. Accordingly, each operating position includes in addition to its own position equipment and the equipment required to function with its own loop circuit, equipment for each of the other loop circuits whereby the routing of messages from its own loop circuit to one or more of the other loop circuits may be readily accomplished. Although four operating positions, namely, positions L, S, Y and T, respectively, terminating four loop circuits, are shown, it is understood that a greater number of operating positions may be provided to terminate a correspondingly greater number of loop circuits. In the upper part of Fig. 1 is shown, in detail, the position equipment provided at operating position L at which calls incoming over loop circuit L are received. In the upper part of Fig. 2 is shown, in detail, the relay network equipment for each of the other loop circuits provided for manually establishing connections, as desired, between a transmitter associated with loop circuit L over which an incoming call is received, and each of the other loop circuits. In the lower part of Fig. 1 is shown, in diagrammatic form, the position equipment provided at operating position S, which equipment is identical with that shown for operating position L in the upper part of Fig. 1. In the lower part of Fig. 1 is shown, in detail, the relay network equipment for each of the loop circuits arranged in a manner similar to that mentioned above for the relay network equipment for loop circuit L except that the connections in this case may be established between loop circuit S over which an incoming call is received and each of the other loop circuits, such as loop circuits L, Y and T and any other loop circuits, not shown, that may be added. In the upper part of Fig. 3 is shown, in diagrammatic form, the position equipment provided at operating position Y, which equipment also is identical with that shown for operating position L in Fig. 1. In the upper part of Fig. 4 is shown, partly in detail, the relay network equipment for each of the loop circuits provided for manually establishing connections, as desired, between the loop circuit Y and each of the other loop circuits. In the lower part of Fig. 3 is shown, in detail, the position equipment provided at operating position T at which calls incoming over loop circuit T are received, this equipment also being identical with that provided at operating position L. In the lower part of Fig. 4 is shown, in detail, the relay network equipment of each of the loop circuits provided for manually establishing connections between the transmitter associated with loop circuit T and each of the other loop circuits.

The equipment provided at each of the operating positions includes a unitary device referred to herein as a typing reperforator-transmitter-distributor set. It is equipped with a switching mechanism responsive to tape perforated code signal combinations for completing several kinds of circuits for performing functions rather than retransmitting message signals. This type of unitary device is disclosed in United States Patent 2,348,214, granted to E. A. Gubisch on May 9, 1944, and employed in the disclosure of United States Patent 2,430,447, granted to D. E. Branson et al. on November 11, 1947. The parts of the specifications and drawings of those patents, which are pertinent to the typing reperforator-transmitter-distributor set, are hereby incorporated in the present disclosure as if fully set forth herein.

Each setting of the tape sensing elements, or pins, provided in the automatic tape transmitter of the typing reperforator-transmitter-distributor set is transferred to cam-operated retransmitting contacts for the purpose of repeating the sensed signal combinations. The transfer is accomplished by a plurality of transfer levers that are respectively brought into contact with the sensing elements permutably set by the perforated tape and this setting is established on a corresponding number of contact assembly groups through sliders individual to each of such groups and articulated to the transfer levers. These sliders in response to signal combinations, effect the automatic operation of a special switching mechanism for closing a plurality of circuits some of which cooperate with the distributor contacts for retransmitting message signals and other of which perform functions such as signaling and the like. Within each contact group there are several contact assemblies and the switching circuits are in electrical association with corresponding contact assemblies in several contact groups so that the switching may be selectively accomplished through a series of contact assemblies, one in each group, operated in permutations by the plurality of sliders under control of the perforated tape. In other words, each of the switching circuits is closed in response to a predetermined sequence of operations of the contact assemblies, one in each group, whereby the desired switching is effected only in response to its predetermined combination of signal impulses in perforated tape, or control strip. When the switching desired is to complete a signaling function, the circuit completed therefor does not include the transmitting contacts of the distributor but includes one contact assembly only of each group or a contact assembly of each group and the armatures of its corresponding relay to perform the necessary function. Message signals are transmitted over a circuit having paths permutably conditioned through one contact assembly of each group and then completed through the transmitting contacts of the distributor. Message communication channels are, therefore, disabled whenever the switching operations are intended to perform functions.

Inasmuch as the equipments provided at the operating positions are identical a description of the equipment at operating position L should suffice for the equipment provided at each of the other operating positions S, Y and T. Typing reperforator-transmitter-distributor set L–101 includes reperforator L–102 and transmitter-distributor L–103. The transmitter-distributor L–103 includes transmitting contacts L–104, transmitting clutch magnet L–TR and distributor clutch magnet L–DR. Typing reperforator L–102 of set L–101 is provided to receive signal combinations from loop circuit L shown entering the system at the lower left-hand corner of Fig. 4, the loop circuit, upon receiving the incoming signals, being effective to operate line relay 2L–1 which repeats the incoming signals to the selector magnet L–SEL of typing reperforator L–102. Selector magnet L–SEL, in response to the incoming signals, causes code signal combinations to be perforated in the tape and the characters corresponding to these signals to be printed on the tape. As hereinbefore stated, each incoming message is preceded by a directing code signal and is followed by code signal combinations for "figures H" which indicates the end of the message. The directing code signal is a functional signal and like a message signal is effective to perforate the tape, print the corresponding character on the tape and permutably operate in a switching mechanism a plurality of sliders in a combination corresponding to that of the signal. However, the combination of sliders operated in response to the directing code selects and closes a particlar circuit of a plurality of work or function controlling circuits to light one of several directing lamps associated with the operating position L, and the selected lamp indicates to which of the loop circuits the message incoming at operating position L is to be retransmitted. The work circuits are selectively closed, one in response to each directing code signal, by four of five contact assemblies of the five groups $La_1$ to $Le_1$, $La_2$ to $Le_2$, $La_3$ to $Le_3$, $La_4$ to $Le_4$ $La_5$ to $Le_5$ and the multiarmatures of each of relays L–105 to L–109, the relays being respectively controlled by the contact assemblies $Le_1$, $Le_2$, $Le_3$, $Le_4$ and $Le_5$ of the five groups which respectively correspond to the five selecting impulses of a signal code combination. Contract assemblies $La_1$ to $La_5$ respectively cooperate with contacts Nos. 1 to 5 of transmitting contacts L–104 to complete the circuit for retransmitting message signals perforated in the tape as received over loop circuit L.

An understanding of the receiving, switching and retransmitting equipment employed in the intercommunication system herein described, may be had by referring to Figs. 91 to 96, inclusive, of D. E. Branson et al. Patent 2,430,447, supra. The retransmitting apparatus as shown in Figs. 91, 92 and 93 of the Branson et al. patent, is provided with a group of tape sensing pins, one each being provided for each of the elements of a code signal combination, five such pins being provided in accordance with the five-unit code signal used herein. Each slider is controlled by a tape sensing pin through a chain of levers and since these sensing pins are controlled by the perforated tape, the chains of levers are therefore under control of the supply of tape between the perforating position and the transmitting position. Consequently, each chain of levers may remain substantially stationary or be actuated in accordance with perforations in the tape. A driving shaft, such as that designated in Figs. 91 and 95 of the Branson et al. patent by reference numeral 9153, is driven by a motor, not shown in the Branson et al. patent. A rotatable shaft is driven from the driving shaft and is controlled by a transmitter clutch magnet and an armature, such as magnet 9111 and armature 9113 of the Branson et al. patent. When the transmitter clutch magnet is operated the rotatable or driven shaft is permitted to engage the driving shaft which is continuously rotating and five cams fixedly mounted on the driven shaft make one or more revolutions, the number depending on the number of start-stop five-unit code signals transmitted by means of the perforated tape. During the first portion of a revolution the tape-advancing cams will cause the tape to be advanced one position through the retransmitting head, such as that designated 2806 in Fig. 28 or 9106 in Figs. 91, 92 and 93 of the Branson et al. patent. For a more detailed description of the manner in which the tape is advanced through the transmitting head, reference is made to E. A. Gubisch Patent 2,348,214, supra, or A. H. Reiber Patent 2,213,476, issued September 3, 1940. The disclosure of Patent 2,213,476, is also hereby made as part of this disclosure as if fully set forth herein. After the tape has been advanced by the tape advancing mechanism the code sensing cams on the driven shaft will cause the lever chains to be operated either to their upper or lower positions, depending on the code combination of the signal. Each of the lever chains comprises a vertical slider, such as that referred to in the Branson et al. patent as slider member 9110. When a slider is operated to its upper position, in accordance with the position of its corresponding sensing pin with respect to a perforated signal in the tape, its corresponding contact group, such as groups $La_1$ to $Le_1$, is operated to its left-hand position, whereas when a slider, say another slider, is operated to its lower position the corresponding contact group, such as group $La_2$ to $Le_2$, is operated to its right-hand position. A second driving shaft, such as that designated in the Branson et al. patent by reference numeral 9151, is driven from the same motor as the above-mentioned driving shaft 9153 and is also continuously rotating. Also, a second rotatable shaft is driven from the second driving shaft and is controlled by a distributor clutch magnet, such as magnet 9147 of the Branson et al. patent. The second driven shaft also has mounted thereon five cams arranged during each revolution thereof to control the closure of the transmitting contacts, such as transmitting contacts L–104, in such a manner that contact Nos. 1 to 5 permutably close, one after another in succession. Transmitter clutch magnet 9111 and distributor clutch magnet 9147 of the Branson et al. patent respectively correspond to transmitter clutch magnet L–TR and distributor clutch magnet L–DR of the reperforator-transmitter-distributor set L–101 of the present application.

Message signals incoming over loop circuit L and repeated by line relay 2L–1 to selector magnet L–SEL of reperforator L–102 are retransmitted by the transmitting contacts L–104 of transmitter-distributor L–103 to transmitter relay 2L–2 which then repeats the signals through each of the loop repeater relays L–ST, L–YT and L–TT. Each of relays L–ST, L–YT and L–TT is arranged to repeat the signals over its respectively associated loop circuits S, Y and T, providing the selecting key, such as one of loop selecting keys LSK, LYK and LTK, which are provided for their respectively associated loop circuits, is operated. The operation of the desired selecting key, say key LSK, operates a relay, such as relay L–SA which opens a normally closed shunt path around the armature and contact of its loop repeater relay, say relay L–ST, to permit the signals to be repeated over the associated loop circuit, say loop circuit S. In a similar manner, signals incoming over loop circuit S are repeated by line relay 2S–1 to the reperforator-transmitter-distributor set at operating position S, signals incoming over loop Y are repeated by line relay 4Y–1 to the reperforator-transmitter-distributor set at operating position Y and signals incoming over loop T are repeated by line relay 4T–1 to the reperforator-transmitter-distributor set T–301 at operating position T.

The preparation for effective association of the transmitter of each loop circuit reperforator-transmitter unit with each of the other loop circuits is accomplished by relay groups respectively provided for each of the other loop circuits. For example, relays L–SA, L–SB, L–ST and L–SC constitute the group provided to establish a transmission connection of the transmitter of messages incoming over loop circuit L to loop circuit S at operating position L; relays L–YA, L–YB, L–YT and L–YC constitute the group provided to establish a transmission connection of the same transmitter to loop circuit Y at operating position L; and relays L–TA, L–TB, L–TT and L–TC constitute the group provided to establish a transmission connection of the same transmitter L to loop circuit T at operating position L. In a similar manner, relays S–LA, S–LB, S–LT and S–LC serve to establish a transmission connection of the transmitter of messages incoming over loop circuit S to loop circuit L at operating position S; relays S–YA, S–YB, S–YT and S–YC serve to establish a transmission connection of the same transmitter to loop circuit Y at operating position S; and relays S–TA, S–TB, S–TT and S–TC serve to establish a transmission connection of the same transmitter to loop circuit T at operating position S. Corresponding relay groups are provided to establish transmission connections between the transmitter of messages incoming over loop circuit Y and loop circuits L, S and T at operating position Y, and between the transmitter of messages incoming over loop circuit T and loop circuits L, S and Y at operating position T.

As hereinbefore stated, repeater relays L–ST, L–YT and L–TT serve to repeat the message signals retransmitted at operating position L to loop circuits S, Y and T, respectively, providing their respectively associated selecting keys LSK, LYK and LTK have been momentarily operated to open the normally closed shunt paths around the windings of these repeater relays. Likewise the repeater relays at each of the other operating positions serve to repeat the message signals incoming over the loop circuit terminating thereat to each of the other loop circuits, for example, repeater relays S–LT, S–YT and S–TT serve to repeat the message signals incoming over loop circuit S at operating position S to loop circuits L, Y and T, respectively; repeater relays Y–LT, Y–ST and Y–TT serve to repeat the message signals incoming over loop Y at operating position Y to loop circuits L, S and T, respectively; and repeater relays T–LT, T–ST and T–YT serve to repeat the message signals incoming over loop T at operating position T to loop circuits L, S and Y, respectively.

Each of the loop circuits is equipped with a busy and a directing lamp for each operating position other than its own operating position. For example, loop circuit L has busy lamp SLB and directing lamp SLD for operating position S, busy lamp YLB and directing lamp YLD for operating position Y and busy lamp TLB and directing lamp TLD for operating position T, loop circuit L having no busy or directing lamp for its own position L. With each pair of lamps there is provided a selecting key whereby the loop circuit associated with such pair of lamps may be connected to the transmitter associated with a loop circuit over which the signals are incoming. For example, at operating position L are provided selecting keys LSK, LYK and LTK for respectively establishing connections of loop circuits S, Y and T to the transmitter associated with loop circuit L when message signals are incoming over loop circuit L.

Also, each of the loop circuits has a start key for its terminating operating position at which messages incoming over it are received. The start key when closed, causes the simultaneous closing of the circuits for respectively maintaining the transmitter clutch magnet and the distributor clutch magnet at the associated operating position operated during the reception of a message from a remote station over the loop circuit of that particular operating position. For example, start key LK, when closed, causes the simultaneous closing of the operating circuits for transmitting clutch magnet L–TR and distributor clutch magnet L–DR, respectively, of transmitter-distributor L–103 and these magnets are maintained operated for the duration of the message received over loop circuit L. In like manner, start keys SK, YK and TK serve the corresponding magnets in their respective transmitter-distributors when message signals are received over loop circuits S, Y and T, respectively.

A relay associated with each loop circuit is also provided for maintaining unresponsive to incoming signals the reperforator of the reperforator - transmitter - distributor normally arranged to receive signals from such loop circuit, that is, to hold the reperforator-transmitter locked-out with respect to receiving message signals from the loop circuit during the time when a message is being transmitted from another of the operating positions to that loop circuit. For example, in loop circuit T relay 4TD is provided to hold the reperforator-transmitter-distributor set T–301 locked-out during the time when a similar distributor set at one of the other operating positions is transmitting signals to loop circuit T.

When a selecting key for a loop circuit at an operating position other than the position at which the loop circuit terminates, is accidentally operated, particularly at a time when the loop circuit selected in error is busy, that is, engaged in an established connection at another of the operating positions, a relay at the operating position whereat the error occurs is operated to thereby open the operating circuit for the start relay at the position in error so that such position is prevented from interfering with the connection previously established at the other operating position. For example, relay T-LO at the operating position T serves, when operated, to prevent operating position T from interfering with a connection established at another operating position, should a selecting key, say key TSK for loop circuit S at operating position T, be accidentally operated at a time when loop circuit S is busy, say in a connection established at operating position I. Key TSK when closed, operates relay T–SA, which upon operating closes at its innermost lower armature and front contact a circuit for operating relay T–LO, the operating circuit for relay T–LO extending at this time over conductor 217, innermost lower armature and front contact of relay L–SA, now operated, conductor L–128, outermost upper armature and front contact of start relay L–START, to grounded battery L–127. Relay T–LO, upon operating, opens the operating circuit for start relay T–START and the operation of the start key TK at operating position T would have no effect with respect to starting transmitter-distributor T–303.

The automatic switching which it is desirable to control from the perforated tape, for example, the switching necessary for selecting and closing the desired directing lamp circuit, retransmitting the message signals, and restoring the apparatus at the operating position to normal at the conclusion of the message, is accomplished by means of the switching mechanism, such as that shown to the left of transmitting contacts L–104 of transmitter - distributor L - 103. The switching mechanism is accomplished through five groups of contacts respectively controlled by the five selecting impulses of the incoming signal. In response to a directing signal the fifth contact assembly of each of the five contact groups may include in series connection the winding of a relay associated with each of the five contact groups, for example, contact assemblies $Le_1$, $Le_2$, $Le_3$, $Le_4$ and $Le_5$ respectively control the operation of relays L–105, L–106, L–107, L–108 and L–109. Each of relays L–105 to L–109 upon responding correspondingly to the opening or closing of its associated fifth contact assembly of assemblies $Le_1$ to $Le_5$, may close by means of one or more of its five armatures any one of five circuits. Any one of three of these circuits operates the desired directing lamp and another operates a relay X, such as relay L–X at operating position L, in response to the code signal for letter X which precedes the directing signals incoming at the operating position when the incoming message is to be retransmitted over two or more loop circuits other than the one over which the message signals are received and still another operates "blank" relay BLK for a reason which will be hereinafter described. As hereinbefore stated, in response to a message signal the first contact assembly of each of the five contact groups may include in series connection a contact of the five transmitting contacts L–103, for example, contact assembly $La_1$ may be connected in series with contact No. 1 of transmitting contacts L–103, contact assembly $La_2$ may be connected in series with transmitting contact No. 2, and in like manner each of the other contact assemblies $La_3$, $La_4$ and $La_5$ may be respectively connected in series with transmitting contacts Nos. 3, 4 and 5. Also a contact of each group is arranged to be selected in accordance with the code signal combination perforated in the tape, for closing a circuit to perform a desired function such as lighting a directing lamp to indicate which of the loop circuits is to receive the call incoming over loop circuit L. In response to the code signals for "Figures H" which are received from the loop circuit at the conclusion of a message, the fourth and the third contact assemblies of each of the five contact groups, say contact assemblies $Ld_1$ to $Ld_5$ representative of the fourth assemblies, and contact assemblies $Lc_1$ to $Lc_5$ representative of the third assemblies, serve to close circuits which are dependent on each other to cause the restoration of the apparatus at operating position L. The second contact assemblies, say contact assemblies $Lb_1$ to $Lb_5$, of each of the five contact groups serve to complete an operating circuit for the transmitter clutch magnet, say clutch magnet L–TR of transmitter-distributor L–103, when there is tape in the transmitter and the normally operated fan relay, such as relay L–FAN, is in operated position prior to the reception of a directing signal at the operating position, such as operating position L. The transmitter clutch magnet in operated position will cause the transmitter to advance the tape to the next character signal perforated in tape. If the next character signal is "letters," that is, a signal with all its selecting impulses marking, for which there are five perforations, the transmitter clutch magnet will again operate and the "letters" character will be discarded. Following this, the transmitter clutch magnet remains operated and the tape is advanced step-by-step discarding "letters" signals, until a directing signal is found perforated in the tape.

Through the mechanics of each contact group of the switching mechanism the movable elements of each contact assembly included in each group are operated simultaneously and the movable elements of the contacts of each of the several groups are, in turn, operated simultaneously through the vertical sliders. The operation of the vertical sliders results from the transfer of a permutable setting of five Y levers through five T levers, the Y and the T levers being respectively designated 9107 and 9165 in the Branson et al. Patent 2,430,447, supra. The Y and T levers were hereinbefore referred to as lever chains.

Through the transfer mechanism the contact groups are operated in every cycle of operation of the tape transmitter. In order that the switching functions may be performed only at the proper time, that is, only when it is desired to effect a switching function, the circuits controlled by the permutable operation of the series of contact assemblies are designed to perform another function only upon receipt of a predetermined code signal combination of certain combinations set aside for that purpose; that is, the selecting or work circuits are rendered operable only in response to certain predetermined code signal combinations which are capable of selecting the permutably operable series of contact assemblies, corresponding thereto.

When an operating position is in an idle condition, that is, when it is not receiving signals from its respectively associated loop circuit, all the relays of the group associated with the operating position are in a released condition with certain exceptions, for example, when operating position L is in an idle condition as when no signals are incoming over loop circuit L, all the relays in the group immediately to the right of typing reperforator-transmitter-distributor L–101 are in a released condition except relays L–FAN, L–NA, L–XC and L–BK3; relay L–FAN being held locked operated in a circuit traceable to the back contact and armature of relay L–H.

When two or more loop circuits are desired in a connection and one of these loop circuits is busy at the time in another connection previously established, a warning signal is continuously repeated over each of the other loop circuits that have already been seized for the desired connection, until the loop circuit busy in a previously established connection is free and available for the desired connection, the signal sent as a warning being the code combination for "blank," that is, all spacing, since this combination is set up on the tape in the transmitting head, which, in turn, followed several directing signals incoming over the loop circuit which seeks to establish the desired connection. When the busy loop circuit becomes free as indicated by the extinguishing of the busy lamp associated with such loop circuit, the corresponding selecting key and the start key at the operating position whereat the connection is to be established, will be successively operated. The "blank" signal which is being continuously repeated over the last of the desired busy loop circuits, will cease to be transmitted shortly after the start key is operated. The start key, upon being operated, causes the transmitter clutch magnet and the distributor clutch magnet at the operating position to start operating simultaneously whereby the message is automatically transmitted over the two or more loop circuits in the desired connection.

DETAILED DESCRIPTION

Figure 1:
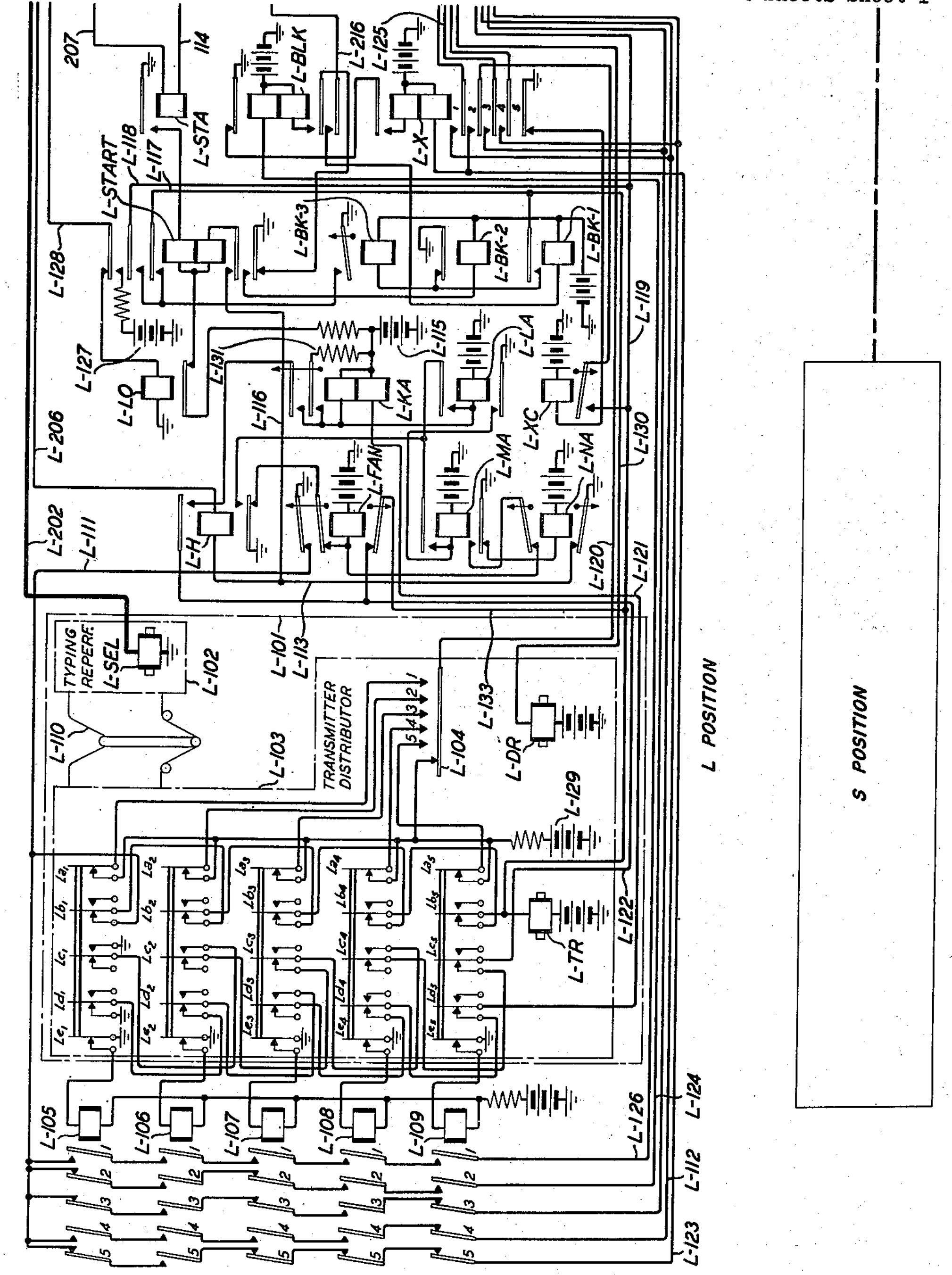
Figure 2:
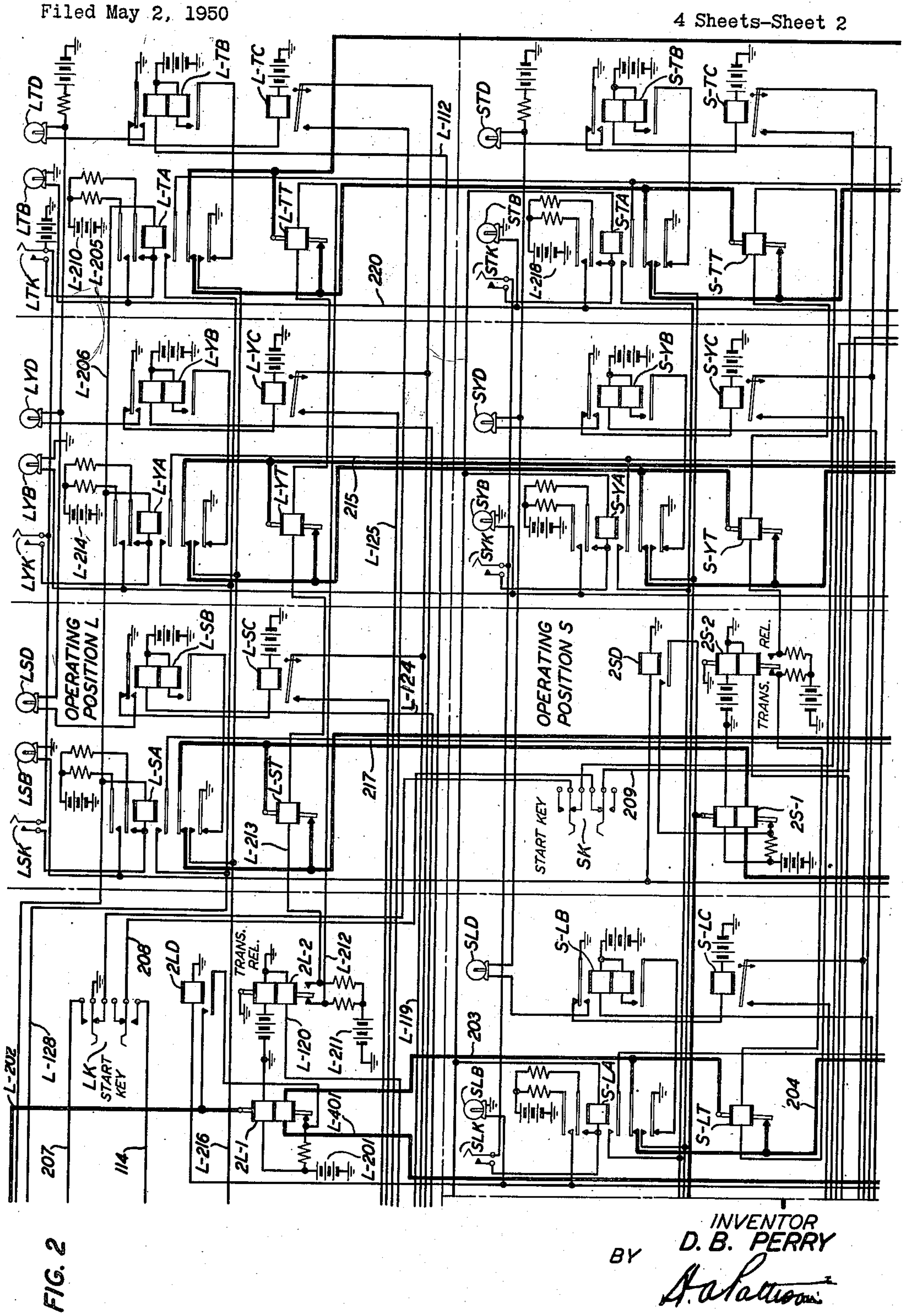
Figure 3:
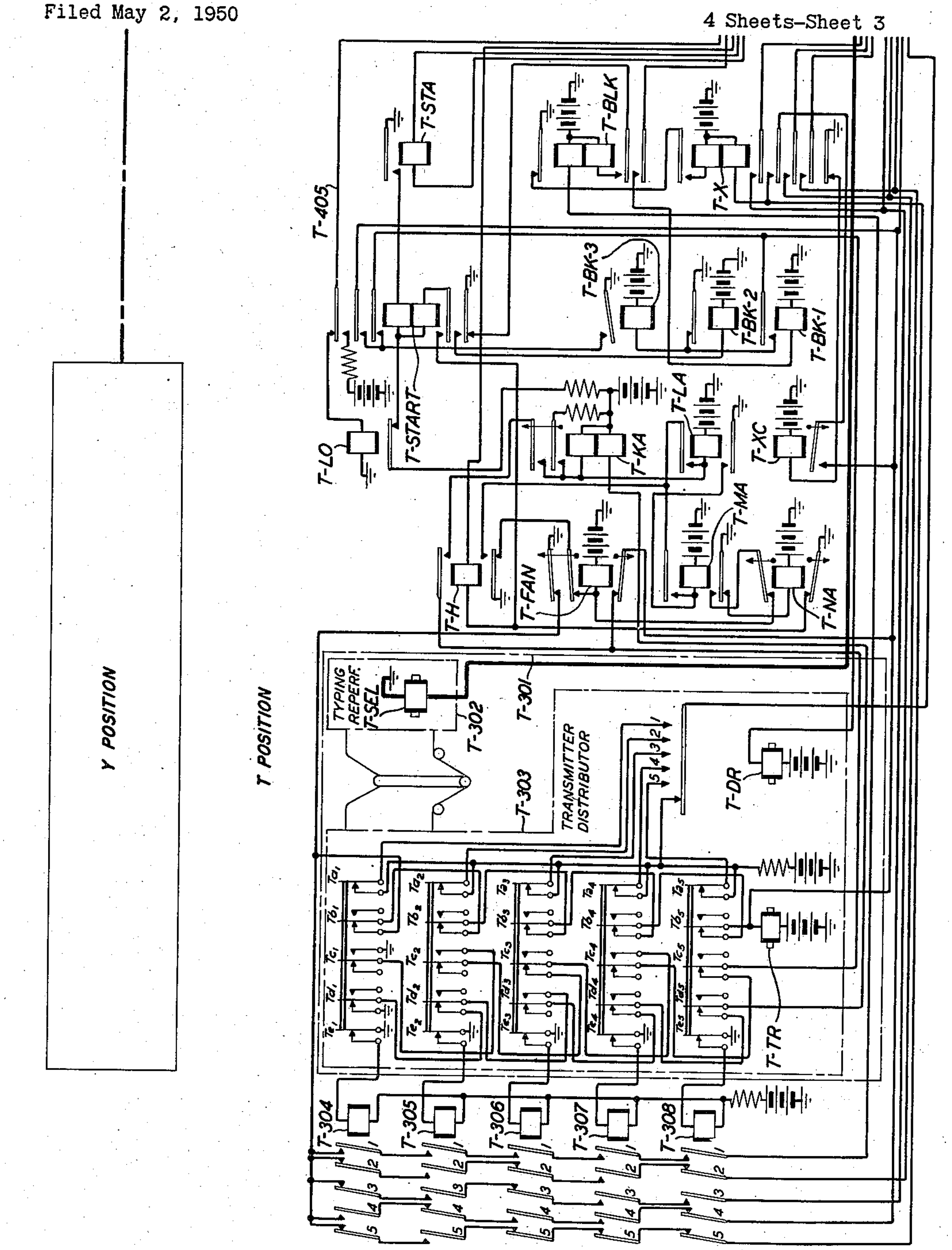
Figure 4:
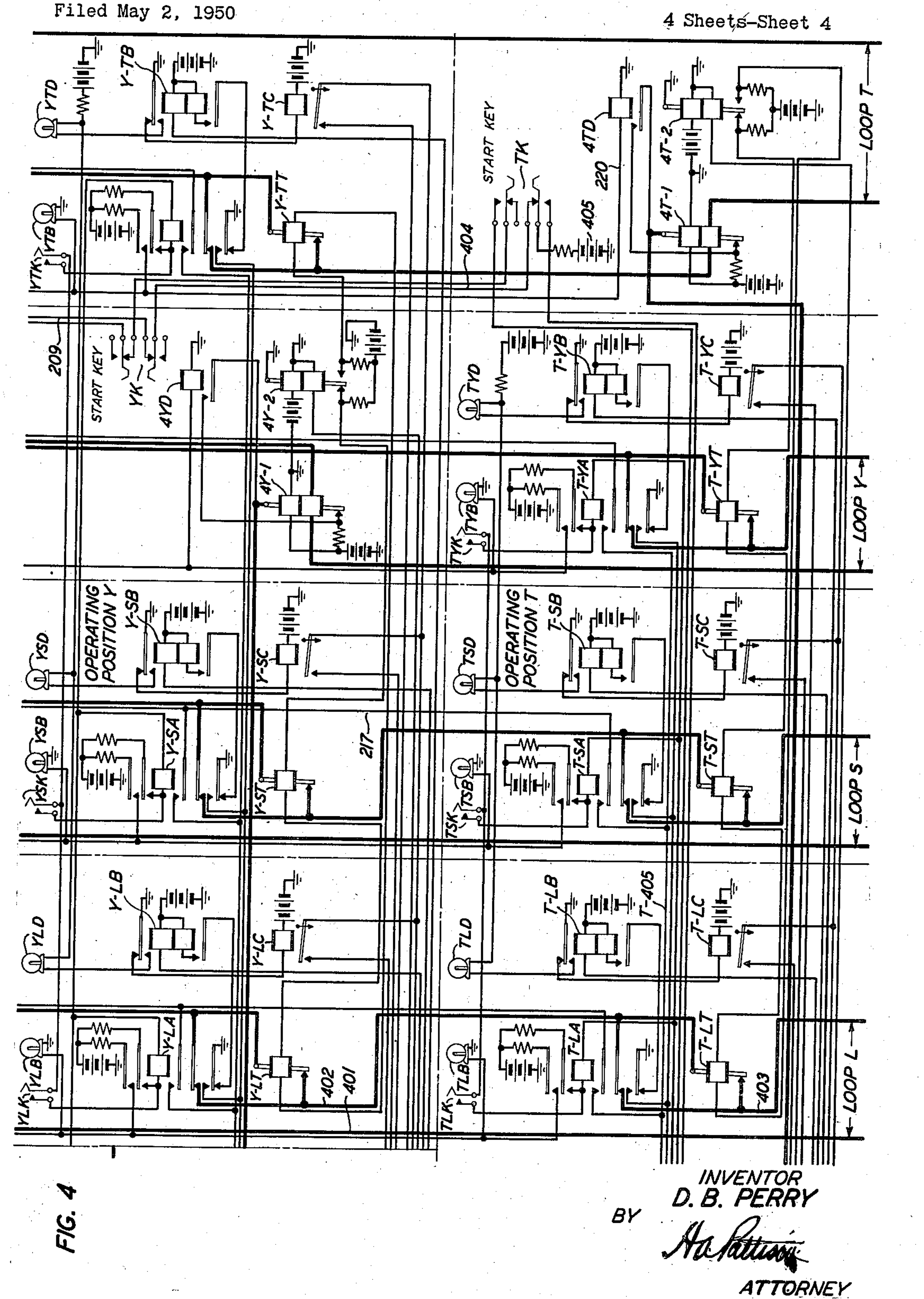

*A call incoming over any one of the loop circuits for retransmission over one only of the other of the loop circuits*

It is assumed herein that a message starts to come in over loop L to operating position L located at the switching center. The typing-reperforator-transmitter-distributor L–101 at operating position L is normally in a receiving condition and the selector magnet L–SEL of typing reperforator L–102 which is in the receiving circuit is normally held in an operated condition over a circuit traceable from grounded battery 201, contact and armature of line relay 2L–1, conductor L–202, through the winding of magnet L–SEL, to ground. As hereinbefore stated, each incoming message is preceded by a directing, or address signal, that is, the signal combination for a certain letter assigned for address purposes to aid in directing the incoming message to the desired loop circuit over which the incoming message is to be retransmitted. To each operating position is herein assigned for the purpose of describing the invention one of these letters for address purposes, the letter being identical to that assigned to the loop circuit primarily associated with this particular operating position.

Should the incoming message received over loop circuit L be intended for retransmission over loop circuit T, the directing code signal combination preceding the message would be the start-stop code combination for the letter T, that is, start, or space, space, space, space, space, mark and stop, or mark. The loop circuit L is traceable from grounded battery at the remote subscriber station (not shown), over conductor 401, through the lower winding of line relay 2L–1, conductor 203, then in parallel paths, one extending over the middle lower armature and back contact of relay S–LA and the other over the armature and contact of repeater relay S–LT, to conductor 204, again in parallel paths respectively extending over the middle lower armature and back contact of relay Y–LA and the armature and contact of repeater relay Y–LT, conductor 402.

again over parallel paths respectively extending over the middle lower armature and back contact of relay T-LA and the armature and contact of repeater relay T-LT, conductor 403, to ground at the remote transmitting station, the upper path of each parallel pair serving to shunt the armature and contact of its associated repeater relay when the associated operating position of operating positions S, Y and T are idle. Relay 2L-1 in response to the directing code signal combination, repeats the signal over the normally closed circuit hereinbefore traced through the winding of selector magnet L-SEL of reperforator L-102. Selector magnet L-SEL accordingly operates, that is, follows the impulses of the incoming code signal combination for the letter T to cause the corresponding combination to be perforated in the tape. The fifth selecting impulse of the five selecting impulses being the only one which is a mark, is the only one perforated in the tape. The letter T is printed on the tape to furnish a visual indication of the received signal. The tape with its perforated signal is advanced in the usual manner in order that the signal combination for the letter T may be sensed by the sensing pins.

The sensing is accomplished by a sensing unit associated with typing reperforator L-102 and forming a part of transmitter-distributor L-103. The sensing unit provided to sense the perforated tape as it leaves the reperforator L-102 controls functions to be hereinafter indicated and described. In order to take full advantage of line time the sensing or transmitting unit, or head, employed with the typing reperforator is of the pivoted or traveling type which is adapted to sense every code perforation recorded in a tape by the typing reperforator, without the necessity of stepping the perforated tape a plurality of feeding distances from the perforator unit into the transmitting or sensing unit. This pivoted transmitting head is described in detail in United States Patent No. 2,262,012, issued November 11, 1941, to Ross A. Lake and reference may be had to that patent for the details both in structure and mode of operation of the pivoted transmitting head. The transmitter comprises essentially a plurality of sensing elements to sense the perforations in a tape, a member for feeding the tape through the transmitter having imparted to it rectilinear motion, and a cam drum for controlling the operation of the sensing elements and the tape feeding member.

On a rotatable shaft, such as shaft 166 shown in Gubisch Patent 2,348,214, supra, are pivotally supported a plurality of Y levers as well as other levers including those required to control the operation of the tape feeding mechanism. The Y levers are individual to the sensing fingers.

As hereinbefore stated the five selecting impulses of the single combination for the letter T are space, space, space, space and mark and when the tape with this perforated signal is passed through the tape transmitting head the normally closed contacts of the five assemblies of each of the upper four groups $La_1$ to $Le_1$, $La_2$ to $Le_2$, $La_3$ to $Le_3$ and $La_4$ to $Le_4$ are opened and the normally closed contacts of the five assemblies of the lowermost group $La_5$ to $Le_5$ are maintained closed. Accordingly, relays L-105, L-106, L-107 and L-108 release and relay L-109 remains operated to complete one circuit only, the circuit being traceable from ground at the outer upper armature of relay L-FAN, conductor L-111, back contact and armature No. 4 of each of relays L-105, L-106, L-107 and L-108, front contact and armature No. 4 of relay L-109, conductor L-112, through the upper winding of relay L-TB, to grounded battery and relay L-TB operates. It is obvious that when contact assemblies $Le_1$, $Le_2$, $Le_3$ and $Le_4$ opened, their associated relays L-105, L-106, L-107 and L-108 released and that if contact assembly $Le_5$ remains closed its associated relay L-109 remains operated to complete the circuit just traced. Relay L-TB upon operating, (1) locks operated through its lower winding and lower armature; (2) opens at its upper armature and back contact the normally closed operating circuit of relay L-TC which now releases to prepare an operating path for transmitter clutch magnet L-TR, but this path at this time serves no useful purpose inasmuch as relay L-X is in a released condition; and (3) closes at its upper armature and front contact an obvious circuit for lighting directing lamp LTD. Directing lamp LTD upon lighting, indicates to an attendant at the switching center that the call incoming over loop circuit L is intended for loop circuit T, and the attendant will consequently operate selecting key LTK for loop circuit T. Selecting key LTK, upon being momentarily closed, completes a circuit traceable from grounded battery, closed contacts of key LTK, conductor L-205, through the winding of relay L-TA, conductor L-206, through the winding of relay L-H, conductor L-113, front contact and lower armature of normally operated relay L-NA, to ground. Relays L-TA and L-H operate. Relay L-TA upon operating, (1) closes at its outer upper armature and front contact an obvious operating path for busy lamp LTB which lights to indicate that loop circuit T is now busy and in parallel therewith, a path for operating relay 4TD which when operated, closes at its armature and front contact a shunt path around the armature and contact of line relay 4T-1 so that signals repeated by repeater relay 4-T-1 over loop circuit T to a subscriber station cannot be repeated by line relay 4T-1 to selector magnet T-SEL of reperforator T-302 at operating position T; (2) closes at its inner upper armature and front contact an obvious locking circuit for itself; (3) prepares at its innermost lower armature and front contact a circuit arranged to be closed in the event that a selecting key for loop circuit T at another operating position is subsequently operated accidentally during the existence of the connection now being established at operating position L, in which event the grounded battery at the outermost upper armature and front contact of start relay T-START and the ground connected to the winding of relay L-LO, causes relay L-LO to operate and thereby prevent the start relay T-START at operating position T from operating should the start key at operating position T be operated, as hereinbefore described; (4) opens at its middle lower armature and back contact the shunt circuit around the armature and contact of the repeater relay L-TT for the loop circuit T whereby this repeater relay L-TT is now in condition to repeat the signals of the incoming message over loop circuit T; (5) connects at its outermost lower armature and front contact a ground connection for a circuit which when closed, serves to operate relay L-BK-1 in the event that two or more loop circuits, including loop circuit T, are selected at operating position L to simultaneously receive a message incoming over loop circuit L, as will be hereinafter described; and (6) opens at its outermost lower armature and back contact the locking circuit for relay L-TB which releases to extinguish directing lamp LTB. Also when relay L-TA operates, the circuit closed to light busy lamp LTB includes closed paths for lighting busy lamps at each of the other operating positions, such as busy lamp STB at operating position S and busy lamp YTB at operating position Y to indicate at these other operating positions that loop circuit T is busy, there being no busy lamp required for loop circuit T at operating position T. Relay L–H upon operating, (1) causes to be removed at its lower armature and back contact the ground for normally maintaining relay L–FAN locked operated and relay L–FAN releases whereby the transmitter clutch magnet L–TR is released to make transmitter-distributor L–103 available for subsequent signals such as, in this case, the signals of the message that is to subsequently follow; (2) prepares at its lower armature and front contact the locking circuits for relays L–LA and L–MA but these relays are not used at this time; and (3) prepares at its upper armature and front contact a locking circuit for relay L–KA which likewise is not used at this time.

Immediately following the operation of selecting key LTK the attendant momentarily operates start key LK for operating position L. Start key LK upon being operated, closes a circuit extending from ground at its upper make contact, conductor 207, through the winding of relay L–STA, conductor 114, lower make contact of switch LK, conductor 208, lower break contact of start key SK for operating position S, conductor 209, lower break contact of start key YK of operating position Y, conductor 404, lower break contact of start key TK of operating position T, to grounded positive battery 405. Relay L–STA operates to close at its armature and contact a circuit extending from ground, through the upper winding of start relay L–START, contact and armature of relay L–LO, to grounded battery L–115 and relay L–START operates. Relay L–START upon operating, (1) locks in a circuit extending through its lower winding, lower armature and front contact, over conductor L–116, conductor L–113, to ground at the front contact and lower armature of normally operated relay L–NA; (2) opens at its outermost upper armature and back contact the operating circuit for relay L–LO whereby relay L–LO is prevented from operating; (3) connects at its outermost upper armature and front contact a connection to grounded positive battery L–127 which will serve to complete an operating circuit in the event that a start key at another operating position is operated whereby the other operating position will be prevented from interfering with a connection being established or estabglished at operating position L; (4) opens at its outer lower armature and back contact the locking circuit for "blank" relay L–BLK which at this time is in a released condition; (5) closes at its outer lower armature and front contact an operating circuit for relay L–BK–2 which operates to cause the release of slow-release relay L–BK–3; and (6) closes at its middle upper and its innermost upper armatures and their respective contacts parallel circuits for simultaneously operating transmitter clutch magnet L–TR and distributor clutch magnet L–DR, the ground connection for the parallel operating paths being had at the upper armature and back contact of relay L–BK–3. The slow-release characteristic of relay L–BK–3 provides a fractional second delay in order to insure that the transmitter and distributor will start operating simultaneously for retransmitting the message to loop circuit T.

Each character of the message is sensed by the sensing pins to close contacts $La_1$, $La_2$, $La_3$, $La_4$ and $La_5$ according to the combination of perforations in each character. These combinations of marks and spaces in turn are sent over contacts Nos. 1 to 5 on the transmitting contact L–104 to the circuit traceable from grounded positive battery L–129, over conductor L–120, through the lower winding of transmitter relay 2L–2, to ground and relay 2L–2 operates accordingly to repeat the signals in a circuit traceable from grounded positive battery L–211, through the windings of repeater relays L–ST, L–YT and L–TT arranged in series connection, the direction of current depending upon whether the selecting impulses of each signal combination is marking or spacing. As hereinbefore stated relay L–TA is in an operated position at this time whereby the normal shunt path around the armature and contact of repeater relay L–TT is open. The shunt path around each of other repeater relays L–ST and L–YT is closed inasmuch as loop circuits S and Y have not been selected for this connection and therefore repeater relay L–TT is the only repeater relay conditioned to repeat the signals over its loop circuit T.

At the conclusion of the message the signals for end of message, that is, "figures H," will be received and their respective combinations will be successively perforated in the tape. The combination of perforations for the "figures" signal will be mark, mark, space, mark, mark, and this combination when sensed by the sensing pins will cause a circuit to be closed extending from ground at contact assembly $Ld_1$ which is closed to its left-hand contact, contact assembly $Ld_2$ which is also closed to its left-hand contact, contact assembly $Ld_3$ which is closed to its left-hand contact, contact assembly $Ld_4$ which is closed to its left-hand contact, contact assembly $Ld_5$ which is also closed to its left-hand contact, conductor L–121, through the lower winding of slow-release L–KA, to grounded positive battery L–115. Relay L–KA is just slow-enough-release in character to hold over until the next code combination is received from transmitter-distributor L–103, the slow-release characteristic being provided by shunting resistance L–131. If the next code combination reperesents the latter H the signal combination for which is space, space, mark, space and mark, relay L–LA will operate in a circuit traceable from ground at the right-hand contact of contact assembly $Lc_1$, right-hand contact of assembly $Lc_2$, left-hand contact of assembly $Lc_3$, right-hand contact of assembly $Lc_4$, left-hand contact of assembly $Lc_5$, conductor L–122, upper armature and front contact of relay L–H, upper armature and front contact of slow-release relay L–KA, which is still held operated, through the winding of relay L–LA, to grounded positive battery. Relay L–LA upon operating, (1) locks over its front contact and upper armature to ground at the front contact and lower armature of relay L–H; and (2) connects ground at its lower armature and front contact to the operating circuit for relay L–MA and relay L–MA operates. Relay L–MA upon operating, (1) locks at its upper armature and front contact in a circuit traceable to ground at the front contact and lower armature of relay L–H; (2) closes at its lower armature and front contact a circuit for reoperating fan relay L–FAN; and (3) opens at its lower armature and back contact the operating circuit for relay L–NA but relay L–NA which is of the slow-release type does not release until after relay L–FAN reoperates. Relay L–FAN, upon operating, closes at its lower armature and front contact another path in the operating circuit, hereinbefore traced, for operating transmitter clutch magnet L–TR, the path extending from ground at the right-hand contact of contact assembly $Lc_1$ to conductor L–122, as hereinbefore traced, over conductors L–133 and L–119, through the winding of transmitter clutch magnet L–TR of transmitter-distributor L–103, to grounded positive battery. Transmitter clutch magnet L–TR operates to step the tape to the next character signal that has been perforated. If this character signal is the "letters" character which has a signal code combination of all mark impulses, a circuit is closed by the sensing pins extending from ground at the outer upper armature and front contact of relay L–FAN, conductor L–111, left-hand contact of contact assembly $Lb_1$, left-hand contact of assembly $Lb_2$, left-hand contact of assembly $Lb_3$, left-hand contact of assembly $Lb_4$, left-hand contact of assembly $Lb_5$, through the winding of transmitter clutch magnet L–TR to grounded positive battery and the transmitter clutch magnet L–TR will again operate to discard the "Letters" character and to step the tape to the next character or until a selecting character signal code combination is again found perforated in the tape to indicate which of the other loop circuits is to receive the succeeding message incoming over loop circuit L or stored on the tape.

*A call incoming over any one of the loop circuits for retransmission over two or more of the other of the loop circuits*

It is assumed herein that a message starts to come in over loop circuit L to operate position L at the switching center. When an incoming message is to be retransmitted to two or more loop circuits the directing characters respectively assigned to the two or more loop circuits are preceded by an "X" signal and followed by a "blank" and a "letters" signal. In response to the code signal combination for the "X" character, the code combination being mark, space, mark, mark and mark, the left-hand contacts of contact assemblies $La_2$, $Lb_2$, $Lc_2$, $Ld_2$ and $Le_2$ which are normally closed will now open and the associated relay L–106 which is controlled by contact assembly $Le_2$, will release to close its five armatures to their respective back contacts, the contact assemblies of the other four groups remaining as shown, that is, in their marking positions. At armature No. 5 of relay L–106 a circuit is completed which extends from ground at the outer upper armature and front contact of relay L–FAN, conductor L–111, front contact and armature No. 5 of relay L–105, back contact and armature No. 5 of relay L–106, front contact and armature No. 5 of each of relays L–107, L–108, and L–109, conductor L–123, through the lower winding of relay L–X, to grounded positive battery and relay L–X operates. Relay L–X, upon operating (1) locks in a circuit traceable through the upper winding, front contact and upper armature of relay L–X, to ground at the back contact and upper armature of "Blank" relay L–BLK; (2) prepares at its Nos. 1, 3 and 4 lower armatures and their respective front contacts circuits for operating transmitter clutch magnet L–TR after each directing signal incoming over loop circuit L is subsequently received to cause the operation of its corresponding relay of relays L–SB, L–YB and L–TB, at which time a slow-release relay of relays L–SC, L–YC and L–TC respectively controlled by relays L–SB, L–YB and L–TB, is caused to release in response to such incoming directing signal; (3) prepares at its No. 2 lower armature and front contact a path in the operating circuit for relay L–X for operating transmitter-distributor L–TR to advance the tape to the first directing signal following the "X" character signal; and (4) opens at its No. 5 lower armature and back contact the operating circuit for the normally operated relay L–XC which because of its slow-release characteristic, requires a short interval of time to release to thereby complete the operating path for transmitter clutch magnet L–TR. The transmitter clutch magnet L–TR operates a sufficient time after the "X" character signal is sensed by the sensing pins of the transmitter and relay L–X has fully operated in response to such signal. Transmitter clutch magnet L–TR releases as soon as the tape is advanced from the sensing point for the "X" character signal. The "X" character signal will then be followed by several character signals each representing one of the loop circuits to which the message is to be retransmitted, it being assumed herein, as hereinbefore stated, that the letters which follow immediately will be T and Y.

The signal code combination for the letter T as hereinbefore stated is space, space, space, space and mark, and this signal code combination when sensed by the sensing pins causes the normally closed contacts of the upper four groups of contact assemblies to open whereby the open contact assemblies $Le_1$, $Le_2$, $Le_3$ and $Le_4$, in turn, cause their respectively associated relays L–105, L–106, L–107 and L–108 to release, relay L–109 remaining operated because the fifth selecting impulse is a mark and the controlling contact assembly $Le_5$ therefore remains closed. The release of relays L–105 to L–108, inclusive, will close a circuit traceable from ground at the outer upper armature and front contact of relay L–FAN, conductor L–111, back contact and armature No. 4 of each of relays L–105, L–106, L–107 and L–108, in turn, front contact and armature No. 4 of relay L–109, conductor L–112, through the upper winding of relay L–TB, to grounded positive battery. Relay L–TB operates and (1) closes at its lower armature a locking circuit for itself, extending to ground at the back contact and outermost lower armature of relay L–TA; (2) opens at its upper armature and back contact the ground connection of the operating circuit of relay L–TC and relay L–TC releases after an interval of time, relay L–TC because of its slow-release character, upon operating, withholding the closing of the operating circuit of transmitter clutch magnet L–TR, which was prepared at the No. 4 lower armature of relay L–X a sufficient length of time to permit the functions of the incoming character signal for the letter T to be fully performed; and (3) closes at its upper armature and front contact a circuit for lighting directing lamp LTD which lights to indicate that loop circuit T is one of the circuits desired to receive the message incoming over loop circuit L. Transmitter clutch magnet L–TR operates to advance the tape to the next directing signal and then releases.

The next succeeding code signal combination perforated in the tape and sensed by the sensing pins is for the letter Y which code combination is mark, space, mark, space and mark. The code signal combination for the letter Y will cause to open the normally closed contacts of the five assemblies of the second and fourth contact groups from the top, whereby their respectively associated relays L–106 and L–108 will release to close a circuit extending from ground at the outer upper armature of relay L–FAN, conductor L–111, front contact and armature No. 2 of relay L—105, back contact and armature No. 2 of relay L–106, front contact and armature No. 2 of relay L–107, back contact and armature No. 2 of relay L–108, front contact and armature No. 2 of relay L–109, conductor L–124, through the upper winding of relay L–YB, to grounded positive battery. Relay L–YB operates and (1) closes at its lower armature and front contact a locking circuit for itself, extending to ground at the back contact and outermost lower armature of relay L–YA; (2) opens at its upper armature and back contact the operating circuit for the normally operated relay L–YC and relay L–YC being of the slow-release type, like relay L–TC as hereinbefore described, releases after a short interval of time; and (3) closes at its upper armature and front contact a circuit for lighting directing lamp LYD which lights to indicate that the message incoming over loop circuit L is to be retransmitted over loop circuit Y also. The release of slow-release relay L–YC closes a path of a circuit hereinbefore traced extending over conductor L–124, front contact and lower armature No. 3 of relay L–X, conductor L–125, front contact and armature of relay L–YC, conductor L–119, through the winding of transmitter clutch magnet L–TR of the transmitter-distributor L–103, to grounded positive battery and the transmitter clutch magnet L–TR operates to advance the tape to the next perforated signal which in this case is the "blank" signal. Transmitter clutch magnet L–TR releases as soon as the tape moves off the sensing position for the letter Y signal, and advances to the "blank" signal which is all spaces, the sensing of the "blank" signal by the sensing pins changes all contacts of the contact groups to their alternate positions, and therefore, each contact of the contact assemblies $Le_1$, $Le_2$, $Le_3$, $Le_4$ and $Le_5$, one of each of the five groups, are opened whereby the respective relays L–105 to L–109 release to close the circuit extending from ground at the outer upper armature and front contact of relay L–FAN, conductor L–111, back contact and No. 1 armature of each of relays L—105 to L—109, inclusive, conductor L–126, through the upper winding of "blank" relay L–BLK, to grounded positive battery. Relay L–BLK operates and (1) opens at its upper armature and back contact the locking circuit for relay L–X and relay L–X releases; (2) closes at its inner lower armature and front contact a locking circuit for itself extending to ground at the back contact and outer lower armature of start relay L–START; and (3) prepares at its outer lower armature and front contact a circuit for operating relay L–BK–1. The release of relay L–X, (1) opens the operating paths for transmitter clutch magnet L–TR, which extended over the armatures and contacts of relays L–TC and L–YC when the latter relays were in their released positions; and (2) closes the operating circuit for slow-release relay L–XC which now operates to open another operating path for transmitter clutch magnet L–TR. With the transmitter clutch magnet released the tape cannot advance until the start key LK of operating position L is operated subsequently to the operation of the selecting keys LTK and LYK. The signal combination at the next step in the tape is the "letters" signal but because the last signal combination sensed by the sensing pins was for a "blank" signal the tape cannot advance.

At this point, the attendant, upon observing the lighted directing lamps LTD and LYD and further observing that the busy lamps in each of the loop circuits T and Y are not lighted, indicating at each of the operating positions L, Y and T that loop circuits T and Y are not busy, operates selecting keys LTK and LYK, these keys, upon being operated, respectively connecting loop circuits T and Y with the transmitter at operating position L. Also the attendant operates start key LK of the operating position L immediately following the operation of the selecting keys.

The operation of the selecting key LTK performs the same functions as hereinbefore described, that is, causing the operation of relays L–TA and L–H. Relay L–TA upon operating, (1) locks in a circuit extending from ground at the lower armature of relay L–NA, conductor L–113, through the winding of relay L–H, conductor L–206, through the winding, front contact and inner upper armature of relay L–TA, to grounded positive battery L–210; (2) closes at its outer upper armature and front contact an obvious operating circuit for busy lamps LTB, STB and YTB to indicate at operating positions L, S and Y that loop circuit T is now busy; (3) opens at its middle lower armature and back contact the normally closed shunt path around the armature and contact of repeater relay L–TT whereby the message incoming over loop circuit L may be repeated over loop circuit T; (4) opens at its outermost lower armature and back contact the locking circuit for relay L–TB which now releases to extinguish directing lamp LTD and reoperate normally operated relay L–TC; and (5) closes at its outermost lower armature and front contact a circuit hereinbefore prepared when blank relay L–BLK operated, the circuit now operating relay L–BK–1. Relay L–BK–1 upon operating, closes an operating circuit for distributor clutch magnet L–DR by connecting ground at the armature and contact of relay L–BK–2, to conductor L–130. Distributor clutch magnet L–DR operates to send a "blank" signal over loop circuits T and Y. Relay L–TC, upon operating, opens an operating path for transmitter clutch magnet L–TR to prevent the stepping operation of the tape at this time whereby the tape cannot move to its next signal position until after the operation of the start key LK.

The operation of selecting key LYK causes the operation of relay L—YA and maintains relay L–H operated. Relay L–YA upon operating, (1) locks in a circuit extending from ground at the lower armature of relay L–NA, conductor L–113, through the winding of relay L–H, conductor L–206, through the winding, front contact and inner upper armature of relay L–YA, to grounded battery L–214; (2) closes at its outer upper armature and front contact an obvious operating circuit for busy lamps LYB, SYB and TYB to indicate at operating positions L, S and T that loop circuit Y is now busy; (3) opens at its middle lower armature and back contact the normally closed shunt path around the armature and contact of repeater relay L–YT whereby the incoming message may be repeated over loop circuit Y also; (4) opens at its outermost lower armature and back contact the locking circuit for relay L–YB which now releases to extinguish directing lamp LYD and reoperate normally operated relay L—YC; and (5) closes at its outermost lower armature and front contact another point in the circuit hereinbefore traced in connection with the operation of relay L–TA for operating distributor clutch magnet L–DR. Relay L–YC upon operating, also opens an operating path for transmitter clutch magnet L–TR to prevent the stepping of the tape at this time until after the operation of start key LK at operating position L.

When the start key LK is operated, relay L–STA operates as hereinbefore described. Relay L–STA upon operating, closes the operating circuit for the start relay L–START. Start relay L–START upon operating, (1) locks to ground in the circuit hereinbefore traced to ground at the lower armature and front contact of relay L–NA; (2) opens at its outer lower armature and back contact the locking circuit for blank relay L–BLK which releases; (3) closes at its outer lower armature and front contact the operating circuit for relay L–BK–2 and relay L–BK–2 operates; (4) prepares at its innermost and its middle upper armature and their respective front contacts the operating paths for transmitter clutch magnet L–TR and distributor clutch magnet L–DR, respectively; (5) opens at its outermost upper armature and back contact the operating circuit for relay L–LO which cannot operate while operating position L is busy; and (6) connects at its outermost upper armature and front contact grounded positive battery to conductor L–128 whereby the LO relay at an operating position other than the busy operating position L would operate should a call be received over the loop circuit at such other operating position at a time when operating position L is busy. Relay L–BLK upon releasing opens at its outer lower armature and front contact the operating circuit for relay L–BK–1 which releases to open at its armature and front contact the operating circuit for distributor clutch magnet L–DR inasmuch as another path for operating magnet L–DR will now be closed at the innermost upper armature and front contact of start relay L–START. Relay L–BK–2 upon operating, opens at its armature and back contact the operating circuit for normally operated relay L–BK–3 which, after a short time interval, releases to connect ground at its armature and back contact to the operating paths for transmitter clutch magnet L–TR and distributor clutch magnet L–DR. Both magnets start operating simultaneously. The message incoming over loop circuit L and perforated in tape L–110 is retransmitted over the contacts Nos. 1 through 5, inclusive, of the transmitting contacts L–104 of the transmitter-distributor L–104, the retransmission circuit being traceable over conductor L–120, through the lower winding of transmitting relay 2L–2 to ground. Transmitting relay 2L–2 repeats the signals to each of repeater relays L–ST, L–YT and L–TT. Relay L–TT repeats the signals over loop circuit T and relay L–YT repeats the signals over loop circuit Y. Repeater relay L–ST does not repeat the signals over loop circuit S because at this time relay L–SA is in the released position to maintain at the middle lower armature and back contact of relay L–SA a shunt path around the armature and contact of repeating relay L–ST.

At the conclusion of the message, signals for "figures H" will be received. When the signal combination for "figures" is sensed by sensing pins a circuit is closed from ground at the left-hand contact of contact assembly $Ld_1$, left-hand contact of contact assembly $Ld_2$, right-hand contact of contact assembly $Ld_3$, left-hand contact of contact assembly $Ld_4$, left-hand contact of contact assembly $Ld_5$, conductor L–121, through the lower winding of relay L–KA, to grounded positive battery L–115 and relay L–KA operates. Relay L–KA is of a type slow enough in releasing to hold over until the next character is sensed by the sensing pins. As hereinbefore stated, the slow-release characteristic is had by means of shunting resistance L–131. Relay L–KA upon operating, prepares at its outer upper armature and front contact a circuit for conditioning relay L–LA for operation in response to the receipt of the next incoming signal should the signal be for the letter H. When the next signal is for the letter H and its signal combination is sensed by the sensing pins a circuit is closed from ground at the right-hand contact of contact assembly $Lc_1$, right-hand contact of contact assembly $Lc_2$, left-hand contact of contact assembly $Lc_3$, right-hand contact of contact assembly $Lc_4$, left-hand contact of contact assembly $Lc_5$, conductor L–122, upper armature and front contact of relay L–H, outer upper armature and front contact of relay L–KA, through the winding of relay L–LA, to grounded positive battery. Relay L–LA operates and locks in the circuit traceable over its front contact and upper armature, to ground at the front contact and lower armature of relay L–H. Relay L–LA upon operating, closes at its lower armature and front contact the operating circuit for relay L–MA. Relay L–MA operates and (1) closes at its upper armature and front contact the locking circuit for itself, also extending to ground at the front contact and lower armature of relay L–H; (2) opens at its lower armature and back contact the operating circuit for normally operated relay L–NA which, being of the slow-release type, releases after a short interval of time; and (3) closes at its lower armature and front contact an operating circuit for reoperating fan relay L–FAN which operates. The reoperation of relay L–FAN is assured by the slow-release characteristic of relay L–NA. Relay L–NA upon releasing, opens at its lower armature and front contact the operating circuit for relay L–H and the locking circuits for relays L–START, L–YA and L–TA all of which relays now release. All the lighted busy lamps LTB, STB, YTB, LYB, SYB and TYB become extinguished. Relay L–H upon releasing, (1) opens at its lower armature and front contact the locking circuits for relay L–MA and L–LA which now release, the release of relay L–MA effecting the reoperation of relay L–NA; (2) closes at its lower armature and back contact the locking circuit for relay L–FAN. Start relay L–START upon releasing, opens the operating paths of transmitter clutch magnet L–TR and distributor clutch magnet L–DR and the operating circuit for relay L–BK–2. Both magnets release to stop the transmitter and distributor at the end of the cycle and relay L–BK–2 releases to reoperate relay L–BK–3. The apparatus at operating position L is now fully restored to normal.

*Called loop circuit is busy*

Should two or more loop circuits be designated as a group to receive a message incoming over another loop circuit and it is found that certain of the loop circuits of the group are busy at the time, a "blank" signal will be automatically sent to those lines of the desired group which are selected and found idle during the interval of time awaited for the busy one or more loop circuits to become idle, which will be indicated when the associated busy lamps of such busy loop circuits become extinguished. When the busy lamp associated with a busy loop circuit becomes extinguished, the attendant operates the selecting key, such as key LYK, of the corresponding loop circuit and the "blank" signal will commence to go out over such corresponding loop circuit such as loop circuit Y, until all the busy loop circuits become idle. When a selecting key for an idle loop circuit is operated the corresponding selecting relay for that loop circuit, such as relay L–YA for loop circuit Y, is operated and locked, and since "blank" relay L–BLK is locked operated at the time by the "blank" signal previously received, the operation of relay L–YA closes an operating circuit for relay L–BK–1. Relay L–BK–1 operates and closes an operating path for distributor clutch magnet L–DR, extending to ground at the back contact and armature of relay L–BK–2. Distributor magnet L–DR operates and continues to operate to transmit "blank" signals over transmitting contacts L–104 to the lower winding of transmitter relay 2L–2 which, in turn, transmits the "blank" signals to repeater relay L–YT. Repeater relay L–YT repeats the "blank" signals over the loop circuit Y inasmuch as the shunt path around its armature and contact is removed at the middle lower armature and back contact of relay L–YA now in a locked operated condition. Likewise, at each of the other loops which are idle at the time, the respective repeater relays such as relays L–TT and L–ST are free to repeat the "blank" signal to their respective loop circuits.

When all the loop circuits of the desired group are idle, the start key such as key LK at the incoming operating position L is operated, to operate relay L–STA. This in turn will cause the operation of start relay L–START. Start relay L–START upon operating, (1) causes the opening of the locking circuit for blank relay L–BLK which releases to thereby cause relay L–BK–1 and distributor clutch magnet L–DR to release; and (2) closes the operating circuit for relay L–BK–2 which operates to remove ground from the operating circuit of normally operated relay L–BK–3. Relay L–BK–3 is of the slow-to-release type and does not release immediately. This slight delay in the release of relay L–BK–3 provides sufficient time to allow relays L–BLK and L–BK–1 to release whereby the distributor comes to a stop at the end of its next cycle when relay L–BK–3 will release. Relay L–BK–3 upon releasing, connects ground at its armature and back contact to the circuit having parallel paths respectively extending through the windings of transmitter clutch magnet L–TR and distributor clutch magnet L–DR of transmitter-distributor L–103 and both magnets operate. This fractional second delay in the release of relay L–BK–3 serves to insure that the transmitter and distributor clutch magnets are both in a condition whereby they are simultaneously operated at the beginning of message transmission. The transmitter and the distributor must start at the same instant to retransmit the message satisfactorily.

*Lock-out arrangements between operating positions*

A lock-out arrangement is provided at each operating position whereby a relay controlled by each of the selecting keys for the loop circuit terminating at such operating position, serves when operated, to make the line relay of the loop circuit ineffective in response to signals incoming over the loop circuit, the selecting keys being respectively provided at the other operating positions. It is assumed herein that operating position L is receiving signals over loop circuit L and sending over loop circuit T and that the attendant operates selecting key STK at operating position S, which selects loop circuit T for message reception at a time when loop circuit T is receiving another message from operating position L. Key STK upon being operated, causes relay S–TA to operate and thereby close a circuit extending from grounded positive battery L–218, outer upper armature and contact of relay S–TA, conductor 220, through the winding of relay 4TD, to ground. Relay 4TD operates and closes at its armature and contact a shunt path around the armature and contact of line relay 4T–1 whereby any signals incoming over loop circuit T are prevented from being repeated to selector magnet T–SEL of the reperforator T–302 at operating position T at a time when message signals are being repeated over loop circuit T by repeater relay L–TT.

A second lock-out arrangement is provided at each operating position; it serving to prevent interference with an established connection should a selecting key be accidentally operated on a loop circuit which is engaged in such established connection. It is assumed herein that the operating position L is sending to loop circuit S and that start relay L–START at the operating position L is operated and that relay L–SA is also operated. Should the attendant accidentally operate selecting key TSK, relay T–SA would operate to close a circuit extending from grounded positive battery L–127, front contact and outermost upper armature of relay L–START, conductor L–128, front contact and innermost lower armature of relay L–SA, conductor 217, innermost lower armature and front contact of relay T–SA, conductor T–405, outermost upper armature and back contact of start relay T–START at operating position T, through the winding of relay T–LO to ground, and relay T–LO would operate to prevent the operation of start relay T–START at operating position T should the start key TK for the operating position T be also operated by the attendant. In this manner it is impossible for a start relay at an operating position to operate when the start relay at another of the operating positions is in an operated condition and, therefore, a message being retransmitted from one loop circuit to one or more other loop circuits established in a connection, cannot be interrupted from another operating position.

Should two start keys at separate operating positions be operated simultaneously neither of their respectively associated start relays would be operated. One or the other of the start keys would have to be operated slightly before the other.

What is claimed is:

1. A telegraph system comprising a switching center, a plurality of operating positions, a plurality of transmission circuits respectively terminating at said plurality of operating positions, means for each of said circuits responsive to a telegraph signal incoming over another of said circuits for designating the selection of circuits to receive a message incoming over said other circuit, manually operable means for each of said circuits for effectively selecting the designated circuits, and means at each of said operating positions for continuously repeating when one or more of the designated circuits are busy, a telegraph signal over the selected ones of said circuits until said one or more busy circuits becomes free and available to receive the message incoming over said other circuit.

2. A signaling system comprising a switching center, a plurality of operating positions, a plurality of channels for transmitting signals, said channels respectively terminating at said plurality of operating positions, means for each of said channels responsive to a coded signal incoming over another of said channels for designating the selection of channels to receive a message incoming over said other channel, manually operable means for each of said channels for effectively selecting for signal transmission purposes two or more of said channels, and means at each of said operating positions for continuously repeating when one or more of said two or more designated channels are busy, a coded signal over the selected one or more of said two or more designated channels until said one or more busy channels becomes free and available to receive the signals incoming over said other channel.

3. In a telegraph switching system, a plurality of half-duplex lines, means for receiving messages from said lines, means for transmitting messages received over any of said lines to any number of the others of said lines, means for seizing idle ones of said other lines selectively, means for initiating message transmission, and means for continuously transmitting non-message signals to seized lines in the interval between operation of said seizing means and operation of said message transmission initiating means to indicate to a remote station on each of said lines the seizure thereof.

4. In a telegraph switching system, a switching station, a plurality of half-duplex lines terminating thereat, a remote station associated with each of said lines, means at said switching station for receiving messages from any of said remote stations, means for transmitting said messages to any number of the others of said remote stations, means for seizing idle ones of said lines selectively, means for initiating operation of said transmitting means, and means for continuously transmitting non-message signals over seized lines in the interval between operation of said seizing means and operation of said message transmission initiating means to indicate at a remote station on each seized line the seizure thereof.

5. In a telegraph system, a telegraph line adapted for message transmission one direction at a time and in either direction, a telegraph station at each end of said line, means at one of said stations for establishing a preparatory condition in anticipation of message transmission to the other station, means for initiating said message transmission, and means at said one station for continuously transmitting non-message signals in the interval between operation of said preparatory means and operation of said message transmission initiating means as a warning against attempted message transmission over said line by the other station.

6. In a telegraph switching system, a switching station, a plurality of half-duplex lines terminating thereat, a remote station associated with each of said lines, means at said switching station for receiving messages from any of said remote stations to be retransmitted to others of said remote stations, means for automatically registering destination address data accompanying received messages, means for seizing idle ones of said lines preparatory to message retransmission, means for initiating message retransmission and means automatically effective when said registering means has registered at least two destinations of a message for continuously transmitting non-message signals to the seized idle lines in the interval between operation of said seizing means and operation of said message retransmission initiating means to indicate at a remote station on each of said seized lines the seizure thereof for message retransmission.

7. In a telegraph switching system, a central office station, a plurality of outlying stations, telegraph lines connecting said outlying stations to said central office station, transmitting means at said central office station, means for selecting any two or more of said lines for transmission of a message from said transmitting means, means for starting said transmitting means to transmit said message, and means operative in any interval intervening operation of any of said selecting means and said transmission starting means for causing said transmitting means to transmit repetitiously a predetermined signal over said selected lines to preclude message transmission from the outlying stations associated with said selected lines.

DONALD B. PERRY.

REFERENCES CITED

The following references are of record in the file of this patent:

UNITED STATES PATENTS

| Number | Name | Date |
|---|---|---|
| 2,346,173 | Light | Apr. 11, 1944 |
| 2,495,683 | Bacon | Jan. 31, 1950 |